United States Patent
Donovan et al.

(10) Patent No.: US 11,614,118 B2
(45) Date of Patent: Mar. 28, 2023

(54) CLINCH FASTENER

(71) Applicant: Acument Intellectual Properties, LLC, Sterling Heights, MI (US)

(72) Inventors: Steven P. Donovan, Roscoe, IL (US); Bryan D. Warju, II, Lake Orion, MI (US)

(73) Assignee: Acument Intellectual Properties, LLC, Sterling Heights, MI (US)

(*) Notice: Subject to any disclaimer, the term of this patent is extended or adjusted under 35 U.S.C. 154(b) by 414 days.

(21) Appl. No.: 16/737,041

(22) Filed: Jan. 8, 2020

(65) Prior Publication Data

US 2020/0217350 A1 Jul. 9, 2020

Related U.S. Application Data (60) Provisional application No. 62/789,880, filed on Jan. 8, 2019.

(51) Int. Cl.
*F16B 35/06* (2006.01)
*F16B 37/06* (2006.01)

(52) U.S. Cl.
CPC ............ *F16B 35/06* (2013.01); *F16B 37/068* (2013.01)

(58) Field of Classification Search
CPC ........ F16B 35/06; F16B 37/04; F16B 37/068; F16B 39/08; F16B 39/10; F16B 41/002
USPC ................ 411/190, 205, 337, 354, 955, 957, 411/960–961, 978
See application file for complete search history.

(56) References Cited

U.S. PATENT DOCUMENTS

| | | | | |
|---|---|---|---|---|
| 2,833,326 A | * | 5/1958 | Knohl | F16B 35/044 411/959 |
| 3,640,326 A | * | 2/1972 | Brown | F16B 39/282 411/959 |
| 3,967,669 A | | 7/1976 | Egner | |
| 4,637,766 A | | 1/1987 | Milliser | |
| 4,808,050 A | * | 2/1989 | Landt | F16B 39/282 411/184 |
| 5,513,933 A | | 5/1996 | Rom | |

(Continued)

FOREIGN PATENT DOCUMENTS

| | | |
|---|---|---|
| CN | 101460750 A | 6/2009 |
| CN | 205744827 U | 11/2016 |

(Continued)

OTHER PUBLICATIONS

International Search Report and Written Opinion which issued in connection with PCT/US2020/012664 dated Apr. 2, 2020.

*Primary Examiner* — Roberta S Delisle
(74) *Attorney, Agent, or Firm* — Quinn IP Law (57) ABSTRACT

A clinch fastener that includes a plurality of ribs disposed under a head of the clinch fastener, wherein the ribs are specifically configured to displace host material more evenly than conventional clinch fasteners. To that end, in cross section, along a line, arc, or combination, going from a central axis of the clinch fastener to an outer periphery of the head of the clinch fastener, each rib preferably provides a curved surface that is formed of multiple sections, wherein different radii define at least two of the sections. The configuration of the ribs allows for a vented escape of host material beyond the rib outside diameter and provides for radially focused material displacement, thereby releasing stress within the host material and reducing warping during clinching.

20 Claims, 11 Drawing Sheets

(56) References Cited

U.S. PATENT DOCUMENTS

| | | | |
|---|---|---|---|
| 5,564,873 A | 10/1996 | Ladouceur et al. | |
| 6,220,804 B1 * | 4/2001 | Pamer | F16B 37/068 411/188 |
| 6,318,940 B1 * | 11/2001 | Mitts | F16B 37/068 411/181 |
| 9,400,005 B2 * | 7/2016 | Osborn | F16B 19/00 |
| 11,242,882 B2 | 2/2022 | Hoshino et al. | |
| 2005/0281634 A1 | 12/2005 | Tibbenham et al. | |
| 2006/0002784 A1 * | 1/2006 | Curtis | F16B 33/004 411/371.1 |
| 2006/0204348 A1 * | 9/2006 | Shuart | F16B 37/068 411/107 |
| 2012/0250231 A1 * | 10/2012 | Xiao | F16B 5/0266 361/679.01 |
| 2012/0251264 A1 * | 10/2012 | Taylor | F16B 25/0021 411/394 |
| 2013/0022782 A1 | 1/2013 | Babej | |
| 2013/0185917 A1 * | 7/2013 | Diehl | F16B 39/282 411/166 |
| 2014/0334898 A1 * | 11/2014 | Taylor | F16B 35/06 411/413 |

FOREIGN PATENT DOCUMENTS

| | | | |
|---|---|---|---|
| DE | 20041047403 A1 | 3/2006 | |
| DE | 20081017689 A1 | 10/2009 | |
| EP | 2762734 A1 | 8/2014 | |
| GB | 1524047 | 9/1978 | |
| GB | 1524047 A | 9/1978 | |
| JP | 2010071313 A | 4/2010 | |
| JP | 2018200095 A | 12/2018 | |
| WO | 2018220887 A1 | 12/2018 | |

\* cited by examiner

CLINCH FASTENER

RELATED APPLICATION (PRIORITY CLAIM)

This application claims the benefit of U.S. Provisional Application Ser. No. 62/789,880, filed on Jan. 8, 2019, and is hereby incorporated herein by reference in its entirety.

BACKGROUND

Clinch fasteners are widely known in the fastener industry, and come in many different forms such as nuts, studs, pins, standoffs, etc. Regardless of the exact form, during installation a clinch fastener is typically pressed into a round mounting hole that has been pre-formed in a workpiece. The workpiece is formed of a host material that is ductile and softer than the clinch fastener. Once the clinch fastener has been properly installed, the clinch fastener is prevented from rotating relative to the host material, and axial movement is also prevented. Thus, once installed, a clinch fastener effectively becomes a permanent part of the workpiece.

Clinch fasteners are used in certain applications because they provide several advantages. For example, typically clinch fasteners are more reliable and provide increased retention compared to either stamped or tapped threads. Clinch fasteners are used in applications where sufficient pushout/pullout (i.e., axial retention load) and torque are required in sheet metal that is too thin and/or too ductile to provide secure fastening by any other suitable method. Even in applications where the sheet metal would be sufficiently thick to allow for thread tapping, using threaded clinch fasteners instead of tapping the threads into the sheet metal is oftentimes the more economical choice. Clinch fasteners can be installed during fabrication to eliminate loose hardware during final assembly. Furthermore, using clinch fasteners often allows for the use of thinner sheet metal as well as provides for a neat appearance as a result of their compact design and low profile.

Clinch fasteners are often used in applications where a component must be readily replaced, and where loose hardware will not be accessible. Because clinch fasteners can be installed during metal fabrication, they can simplify and expedite component mounting and assembly operations, including those performed in the field.

As discussed above, when a clinch fastener is installed by pressing it into a mounting hole in a workpiece (such as in sheet metal), the clinch fastener displaces the host material around the mounting hole, causing the host material to cold flow into an annular recess or undercut in the clinch fastener. The installation of a clinch fastener often results in high stress areas in the host material (typically under a head of the fastener), sometimes to the extent that there is either warping of the workpiece, where the joint is adversely impacted, or the clinch fastener ends up not being perpendicular to the workpiece after installation (i.e., the clinch fastener is cockeyed or crooked).

SUMMARY

An object of an embodiment of the present invention is to provide a clinch fastener that is configured to provide for a more uniform stress distribution in the host material.

Briefly, an embodiment of the present invention provides a clinch fastener that includes a plurality of ribs disposed under a head of the clinch fastener, wherein the ribs are specifically configured to displace host material more evenly than conventional clinch fasteners. To that end, in cross section, along a line going from a central axis of the clinch fastener to an outer periphery of the head of the clinch fastener, each rib preferably provides a curved surface that is formed of multiple sections, wherein different radii or line segments define each of the sections. Preferably, the ribs diminish in height as they extend to the outer periphery of the head of the clinch fastener. Additionally, preferably the ribs are equally spaced apart under the head, but that is not imperative.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

While this invention may include embodiments in different forms, there are shown in the drawings and will be described herein in detail, specific embodiments with the understanding that the present disclosure is to be considered an exemplification of the principles of the invention, and is not intended to limit the invention to that as illustrated.

Figure 1:
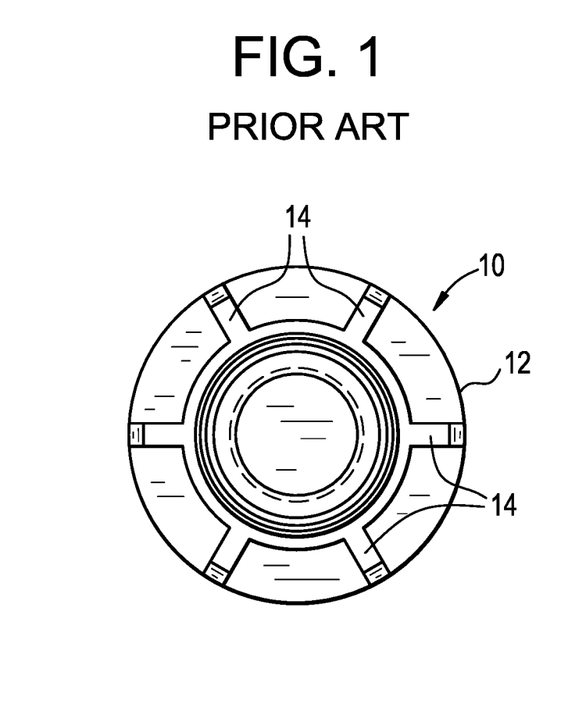
FIG. 1 is a bottom view of a prior art clinch fastener.
Figure 2:
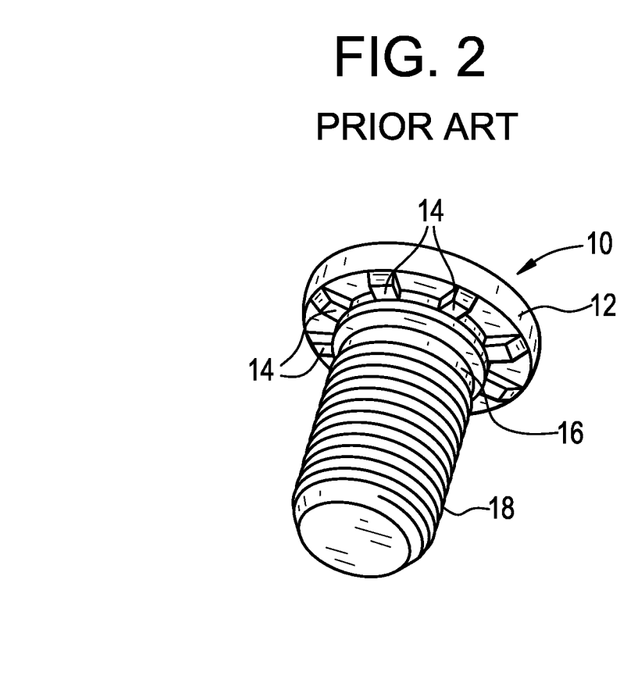
FIG. 2 is a bottom, perspective view of the prior art clinch fastener shown in FIG. 1.
Figure 3:
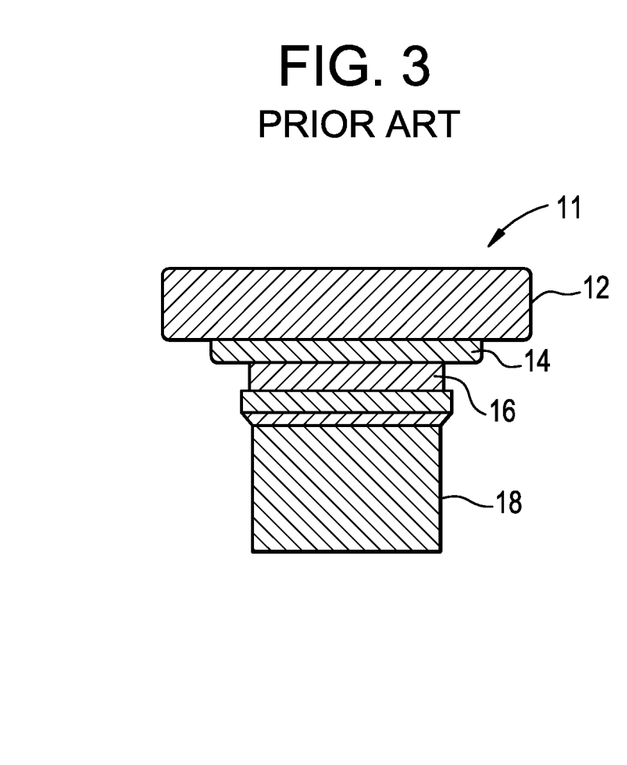
FIG. 3 is a cross sectional view taken along line 3-3 of FIG. 4, another prior art fastener.
Figure 4:
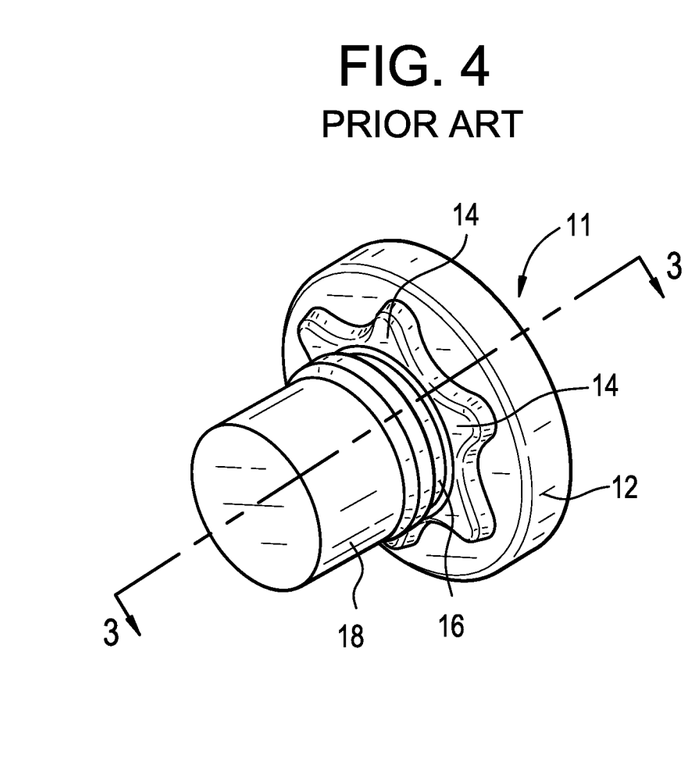
FIG. 4 is a bottom, perspective view of the prior art clinch fastener shown in FIG. 3.

FIGS. 1-2 illustrate a prior art clinch fastener 10 that is consistent with that which is disclosed in U.S. Pat. No. 5,513,933. Specifically, FIG. 1 is a bottom view thereof, and FIG. 2 is a bottom, perspective view thereof. FIGS. 3 and 4 illustrate another type of prior art clinch fastener 11. Specifically, FIG. 3 is a bottom view thereof, and FIG. 4 is a bottom, perspective view thereof. Both prior art fasteners 10 and 11, shown in FIGS. 1-4, include a head 12, straight or flat ribs 14 under the head 12, an annular recess 16 proximate the ribs 14, and a shaft 18.

Figure 5:
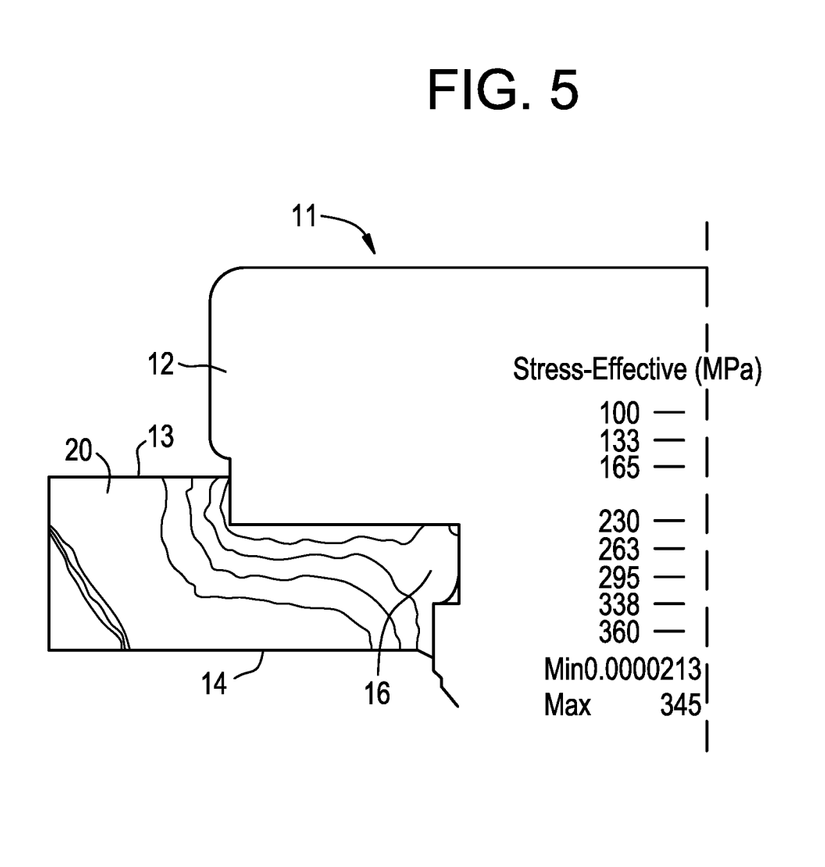
FIG. 5 is a partial cross-sectional view (in the form of a Finite Element Analysis diagram) showing the prior art clinch fastener of FIGS. 3 and 4, after the clinch fastener has been installed relative to a workpiece (i.e., the host material)

Although both fasteners 10 and 11 include straight or flat ribs 14 and either fastener 10 or 11 can be used for explanation purposes, for the sake of example, FIG. 5 is provided and FIG. 5 is a partial cross-sectional view (in the form of a Finite Element Analysis diagram) showing the prior art clinch fastener 11 of FIGS. 3 and 4, after the clinch fastener has been installed relative to a workpiece 20 (i.e., the host material). FIG. 5 shows that, when installed, the straight rib 14 displaces an excess of the host material causing the host material to cold flow into the annular recess 16. This causes high stress areas in the host material 20 under the head 12 of the clinch fastener 11 because the material is confined by the shape of the rib, wherein the material is prevented from flowing both radially outward and perpendicular to the rib. This could result in warping of the workpiece 20 (i.e., wherein the surface of the workpiece 20 deforms next to the clinch fastener 11, such as in area 13), the clinch fastener 11 not being perpendicular to the workpiece 20 after installation, as well as other, undesirable traits with regard to the joint. For example, the configuration of each of the ribs 14 tends to displace workpiece material in a direction toward the adjacent ribs, causing increased stress between the ribs 14.

Figure 6:
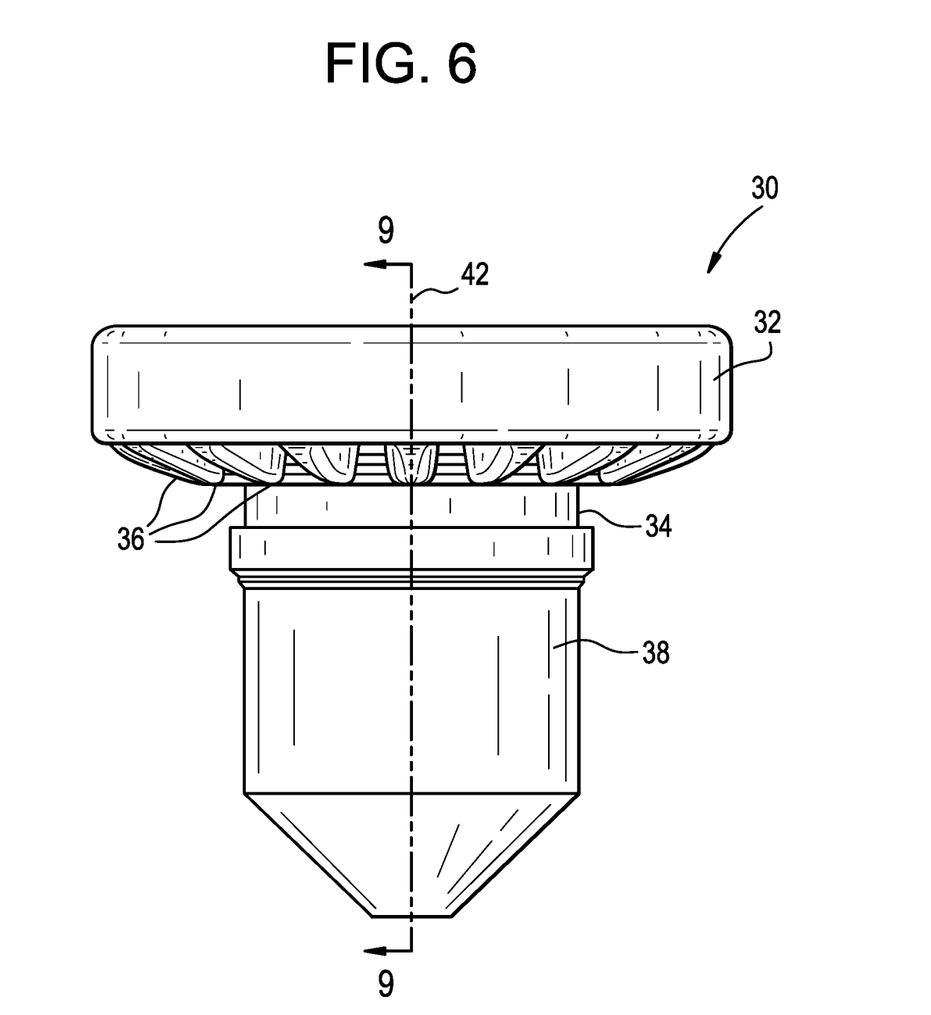
FIG. 6 is a side view of a clinch fastener in the form of a stud, wherein the clinch fastener is in accordance with an embodiment of the present invention.
Figure 7:
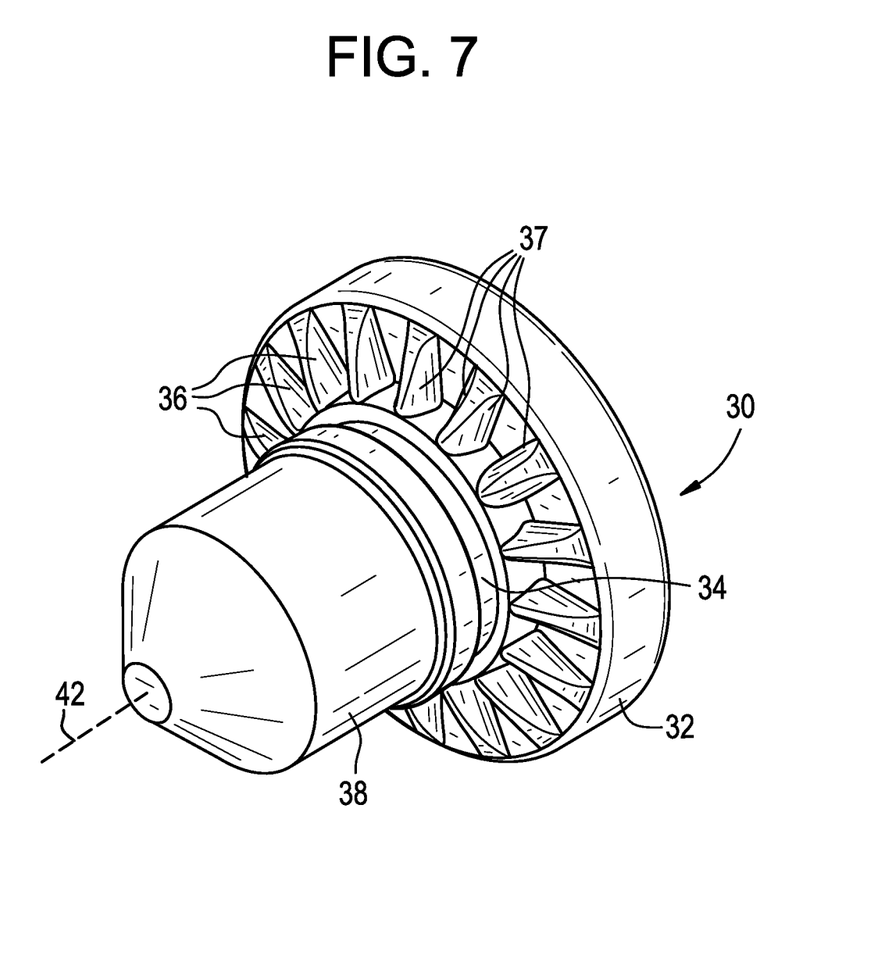
FIG. 7 is a bottom, perspective view of the clinch fastener shown in FIG. 6.
Figure 8:
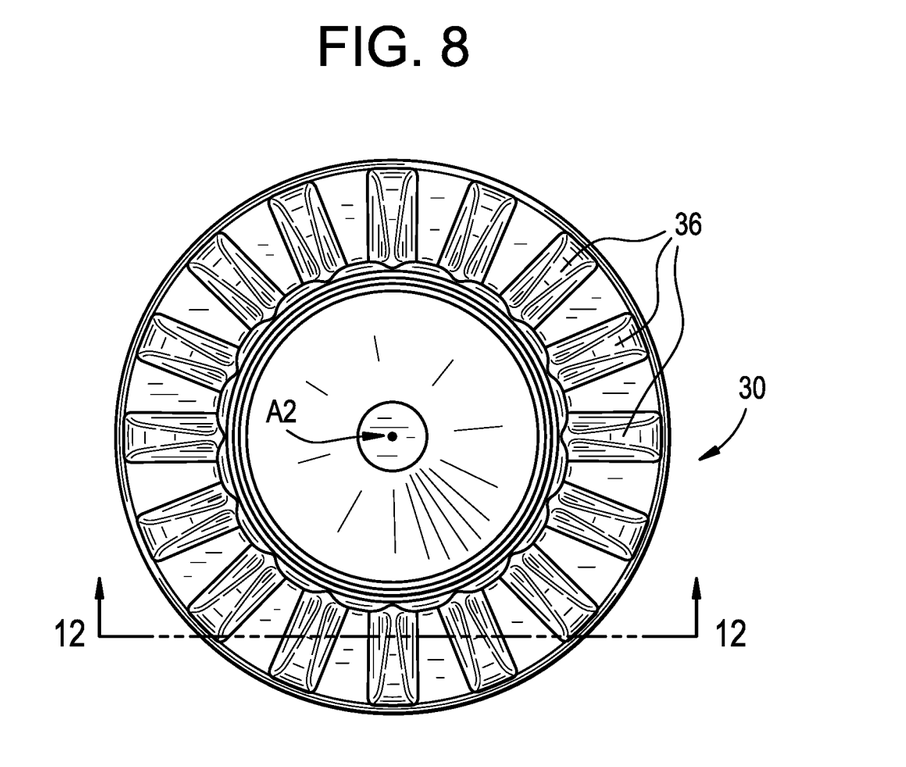
FIG. 8 is a bottom view of the clinch fastener shown in FIGS. 6 and 7.
Figure 9:
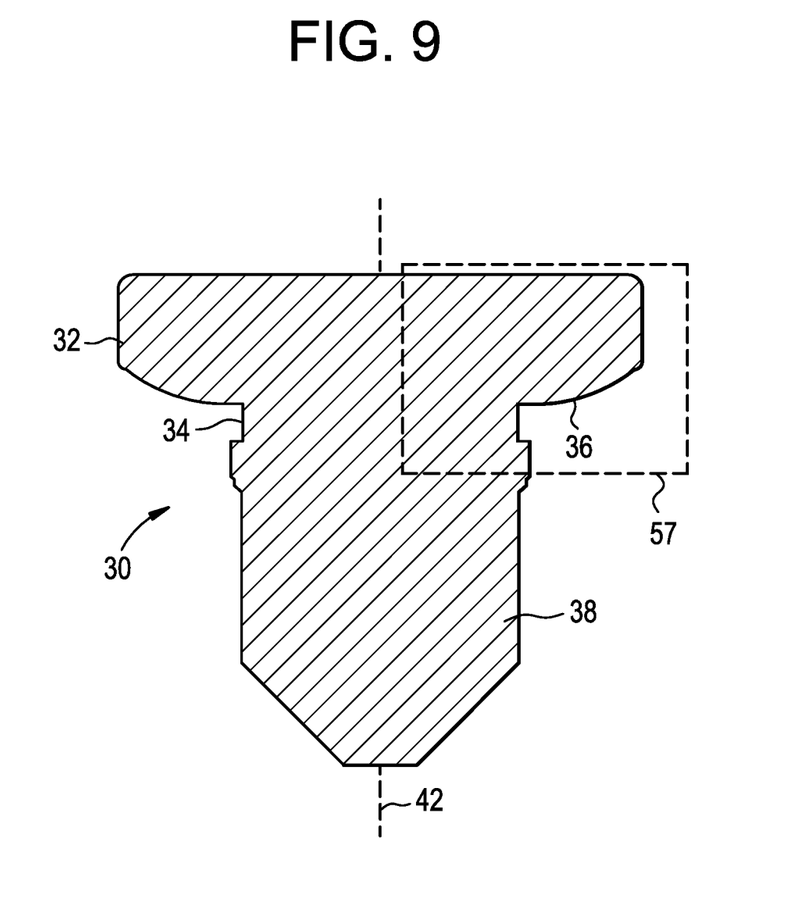
FIG. 9 is a cross-sectional view of the clinch fastener shown in FIGS. 6-8, taken along line 9-9 of FIG. 6.

In contrast, FIGS. 6-8 illustrate a clinch fastener 30 that is in accordance with an embodiment of the present invention (FIG. 9 is a cross-sectional view of the clinch fastener 30 shown in FIGS. 6-8, taken along line 9-9 of FIG. 6). As shown, the clinch fastener 30 is similar to the clinch fasteners 10 and 11 shown in FIGS. 1-4 and includes a head 32, an annular recess 34 proximate ribs 36, and a shaft 38. However, the clinch fastener 30 shown in FIGS. 6-9 includes ribs 36 under the head 32 that are specifically configured to displace host material more evenly than conventional clinch fasteners, such as the clinch fasteners 10 and 11 shown in FIGS. 1-4. As shown in FIGS. 7 and 8, preferably the ribs 36 are equally spaced apart under the head 32, but that is not imperative. As shown in, for example, FIGS. 7, 8 and 12, the side walls 37 of each of the ribs 36 could be tapered (while the sidewalls are shown as being outwardly tapered (i.e., in relation the adjacent rib 36), they could be provided as being inwardly tapered instead).

Figure 10:
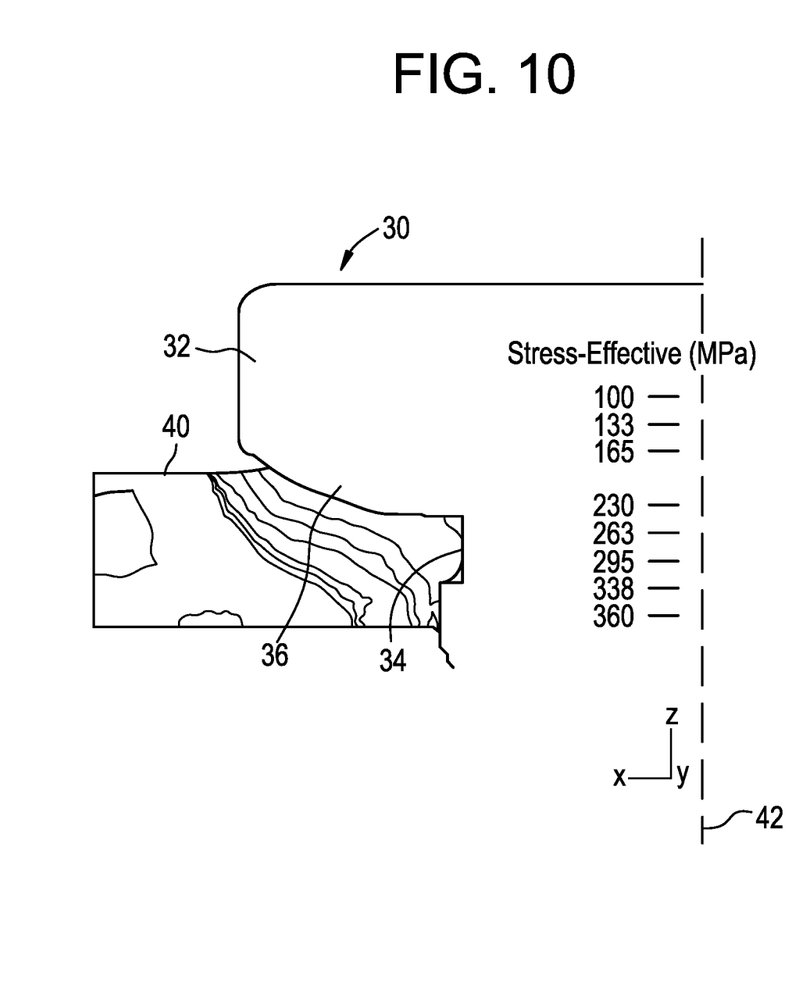
FIG. 10 is a partial cross-sectional view (in the form of a Finite Element Analysis diagram) showing the clinch fastener of FIGS. 6-9, after the clinch fastener has been installed relative to a workpiece (i.e., the host material)

FIG. 10 is a partial cross-sectional view (in the form of a Finite Element Analysis diagram) showing a portion of the clinch fastener 30 of FIGS. 6-9 after the clinch fastener 30 has been installed relative to a workpiece 40 (i.e., the host material). As shown, the clinch fastener 30, as a result of having the special ribs 36, provides a more uniform stress distribution in the host material compared to what is shown in FIG. 5 with regard to the corresponding prior art clinch fastener 11. Each of the special ribs 36, given its shape and configuration, tends to displace the workpiece material outward, as opposed to a direction toward adjacent ribs. As such, stress is minimized between the ribs.

Figure 11:
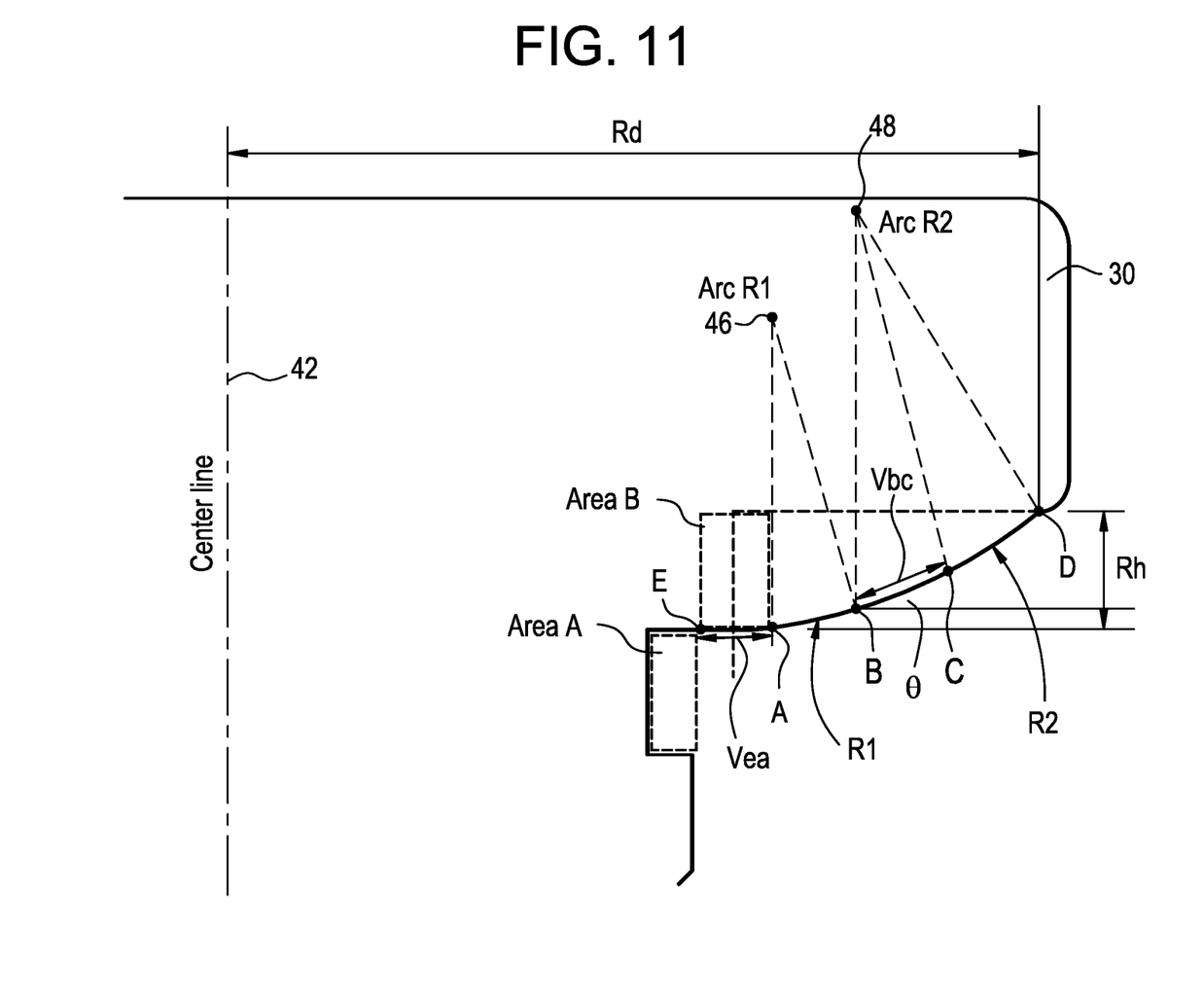
FIG. 11 is effectively the boxed portion 57 of FIG. 9, after the clinch fastener has been installed relative to a workpiece (i.e., the host material), annotated for discussion purposes.

Preferably, each rib 36 of the clinch fastener 30 is effectively identical. The ribs 36 of the clinch fastener 30 shown in FIGS. 6-10 will now be described in more detail with reference to FIG. 11. FIG. 11 is effectively the boxed portion 57 of FIG. 9, annotated for discussion purposes, and showing the clinch fastener 30 after the clinch fastener 30 has been installed relative to a workpiece (i.e., the host material). In FIG. 11, "Area A" is effectively the area of the recess defined by a predetermined height and width based on preferred performance of the recess 34 that is configured to receive cold flow of host material 40 during installation of the clinch fastener 30. Preferably, the height and width of "Area A" is dictated by standards, and the flow factor is dictated by the ductility of the host material 40 to which the clinch fastener 30 is staked during installation (i.e., the greater the ductility of the host material, the higher the flow factor). The dimension "Rh" is effectively the height of each rib 36 at its highest point, and that dimension is also preferably dictated by workpiece thickness. The dimension "Rd" is effectively the distance from the central axis 42 of the clinch fastener 30 to the end of each rib 36 (the central axis 42 is also identified in FIGS. 6-10). That dimension is preferably dictated by embedment and pull through requirements.

As shown in FIG. 11, in cross section, along a line going from a central axis 42 of the clinch fastener 30 to an outer periphery of the head 32 of the clinch fastener 30 (i.e., to the end of each rib 36), each rib 36 is formed of multiple sections. As shown in FIG. 11, preferably the ribs 36 diminish in height as they extend toward (but not necessarily all the way to) the outermost periphery of the head 32 of the clinch fastener 30. Preferably, each rib 36 commences with a section that is perpendicular (or at least substantially perpendicular) to the central axis 42 of the clinch fastener 30. As shown in FIG. 11, this section goes from point E (i.e., the corner of the recess) to Point A, and is identified as vector "Vea." The area "Area B" is a product of both the height of each rib 36 at its highest point ("Rh") and "Vea" (i.e., the distance from point E to point A). Also, "Area A"="Area B" multiplied by the flow factor.

As such,

"Area $B$"="$Rh$" multiplied by "$Vea$";

"$Vea$"="Area $B$"/"$Rh$"; and

"$Vea$"=("Area $A$"/the flow factor)/"$Rh$"

The remainder of the rib 36 is preferably a plurality of sections at least two of which are curved sections defined by different radii or a plurality of short line segments. Preferably, one section extends from point A to point B as shown in FIG. 11, and is defined by a radius identified in FIG. 11 as "Arc R1". Preferably, the focal point 46 or center of "Arc R1" coincides vertically (i.e., parallel to the central axis 42 of the clinch fastener 30) with point A, and the radius of the arc is approximately 10-60 degrees and is dictated by fastener size.

Preferably, another section extends from point B to point C (defined as vector Vbc) as shown in FIG. 11, and is substantially flat or straight (or may be provided as being arcuate). This starts at point B when the Arc R1 slope from horizontal equals Theta. Arc R1 and Vbc are tangent at point B. Then point C has a linear relationship to point B and is defined by linear equation based on endpoints B and C in FIG. 11. The horizontal dimension of point C from the center axis is directly related to the position of point D and Arc R2.

Yet another section extends from point C to point D (i.e., the outer end of the rib 36) as shown in FIG. 11, and is defined by a radius identified in FIG. 11 as "Arc R2". Preferably, the focal point 48 or center of "Arc R2" coincides vertically (i.e., parallel to the central axis 42 of the clinch fastener 30) with point B, and the radius of the arc is approximately 10-60 degrees. Preferably, "Arc R2" starts at point C and ends at point D (i.e., the outer end of the rib 36). Preferably, the focal points 46, 48 or centers of "Arc R1" and "Arc R2" (i.e., their vertical locations meaning how far they are from points A and B, respectively) depend on "Rh" and "Point D," and the profile of the rib 36 is fully constrained going from point A to point D.

Thus, the plurality of sections of the rib form a parametric profile of the rib, wherein the parametric profile of the rib is further defined by the parameters including the rib height, the distance from the central axis of the fastener to the end of the rib, and the predefined angle Theta as shown in FIG. 11.

Figure 12:
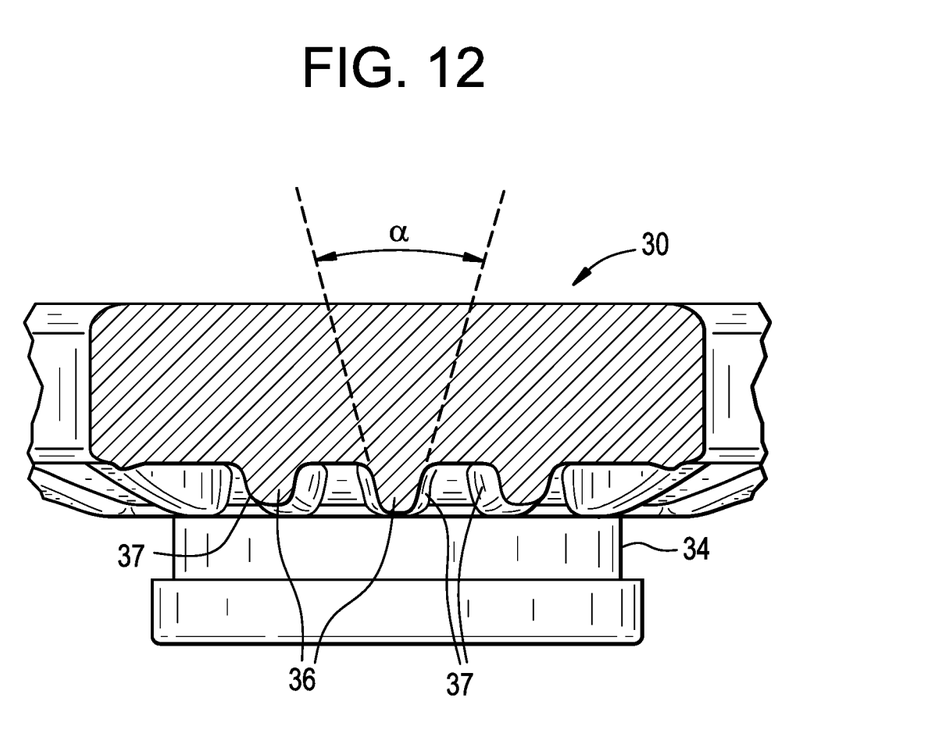
FIG. 12 is a cross-sectional view of the clinch fastener shown in FIG. 8, taken along line 12-12 in FIG. 8.

FIG. 12 is a cross-sectional view of the clinch fastener 30 shown in FIG. 8, taken along line 12-12 in FIG. 8. As shown, preferably the sides 37 of the ribs 36 are tapered or sloped, such as at an angle alpha, which can vary based on manufacturing tolerances that occur during rib formation. In an embodiment of the invention, for illustrative purposes only shown in FIG. 12, alpha is a twenty degree angle (included, meaning both sides) angle (for example), such that the slope of the sides 37 of the ribs 36 facilitate the flow of workpiece material between the ribs 36 during staking of the clinch fastener 30.

The configuration of the ribs 36 provides for radially focused material displacement, thereby diffusing stress within the sheet material 40 and reducing warping during clinching. Preferably, the ribs 36 of the clinch fastener 30 are optimized to match the torsional stress distribution by decreasing the amount of sheet material while maximizing torsional (blind hole failure torque) of the clinch fastener 30. The configuration of the ribs 36 minimizes the volume of the rib profile radially outward as the force on the rib increases as torque is applied after staking, thereby creating a more uniform stress distribution on the rib. The specially designed curved-shaped rib also allows for a vented escape of sheet material beyond the rib outside diameter. In contrast, conventional rib designs cause the sheet material to be contained and not vented. While a rib design which is in accordance with an embodiment of the present invention is not limited to being used only with soft joint materials, the rib design is ideal for use with soft joint materials (i.e., such as with aluminum, etc.). A rib design which is in accordance with an embodiment of the present invention allows for the use a high strength clinch nut and stud, even in connection with soft joint materials. The rib configuration could even result in thinner sheet material being able to be used. The rib configuration causes less distortion of the sheet material resulting in a flatter seating area, and results in the clinch fastener being more perpendicular to the sheet material after installation. Using the clinch fastener disclosed herein results in reduced warping between installed clinch fasteners, and the installation holes have less distortion before and after assembly. The rib configuration reduces the distance needed between holes and reduces edge effects during installation. The rib configuration results in reduced distortion of the sheet material, which results in less distortion of the hole and better performance. The rib configuration allows for the use of higher staking force, without running the risk of causing deforming the mating materials surface and allowing for the clinching of thinner materials. The rib configuration also allows the fastener to be staked at a higher force to ensure proper seating of the fastener.

Figure 13:
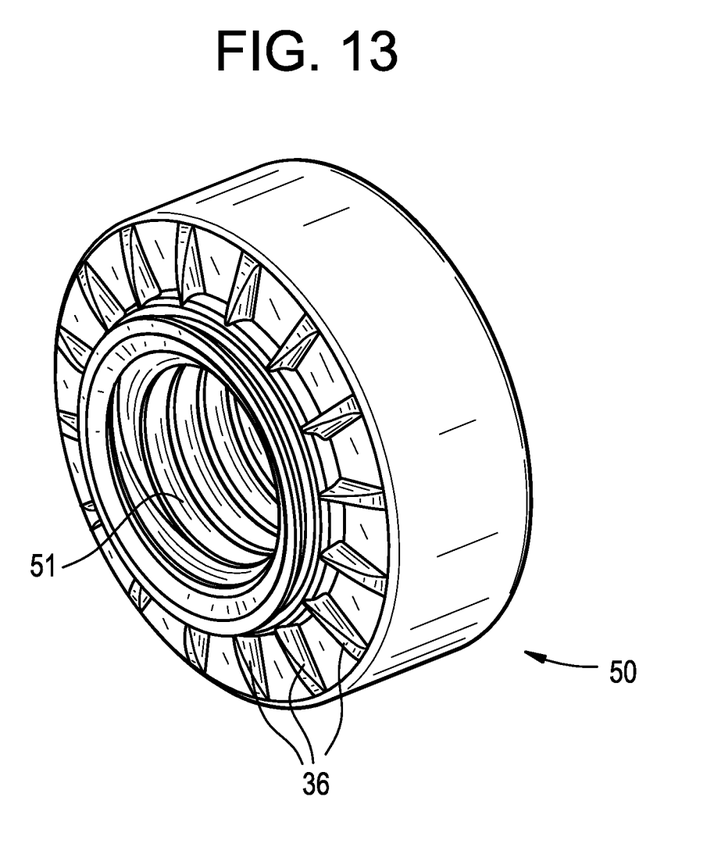
FIG. 13 is bottom, perspective view much like FIG. 6, but where instead of being in the form of a stud, the fastener is in the form of a nut.

While FIGS. 6-12 illustrate a specific embodiment of the present invention in the form of a stud, the present invention can be employed in many other embodiments, such as in the form of a nut 50 (having a threaded bore 51) as shown in FIG. 13 which includes the ribs 36 that have been described hereinabove. Still other embodiments are entirely possible while still staying very much within the scope of the present invention. Additionally, despite a specific number of ribs 36 being depicted herein, any number of ribs be provided on a given fastener while still staying very much within the scope of the present invention. Still further, while the rib 36 has been described as preferably comprising a plurality of sections at least two of which are curved sections defined by different radii, the rib 36 can instead comprise a plurality of flat sections that collectively provide that the rib 36 gradually diminishes in height as it extends to its outer periphery (i.e., to the end of the rib 36).

While specific embodiments of the invention have been shown and described, it is envisioned that those skilled in the art may devise various modifications without departing from the spirit and scope of the present invention. For example, while the embodiments have been described and depicted as being round in shape and being used with round holes, obround versions are totally possible for use with obround holes while still staying very much within the scope of the present invention.

What is claimed is:

1. A clinch fastener for installation relative to a workpiece, said clinch fastener comprising:
   a shaft defining a central axis of the clinch fastener;
   a head cooperating with the shaft, the head having an outer periphery;
   a plurality of ribs disposed under the head to engage the workpiece upon installation of the clinch fastener to the workpiece, the plurality of ribs extending radially outward in a direction from the central axis of the clinch fastener to the outer periphery of the head, wherein each of the plurality of ribs includes multiple sections forming at least a sidewall and a parametric profile for each rib, including at least a first section disposed proximate the shaft extending perpendicular to the central axis and an outer end adjacent the outer periphery of the head,
   wherein the plurality of ribs are configured to radially displace workpiece material when secured to the workpiece to diffuse stress within the workpiece material.

2. A clinch fastener as recited in claim 1, wherein at least two of the sections are defined by different radii or a plurality of line segments.

3. A clinch fastener as recited in claim 1, wherein at least two of the sections are flat, and at least one is parallel to the head.

4. A clinch fastener as recited in claim 1, wherein each of the ribs diminish in height as each of the ribs extends in a direction going from the central axis of the clinch fastener to the outer periphery of the head of the clinch fastener.

5. A clinch fastener as recited in claim 1, wherein the ribs are equally spaced apart under the head.

6. A clinch fastener as recited in claim 1, further comprising an annular recess proximate the plurality of ribs under the head.

7. The clinch fastener as recited in claim 6, further comprising an annular recess proximate the ribs, disposed between the head and the shaft.

8. A clinch fastener as recited in claim 1, wherein the clinch fastener comprises a nut having a threaded bore.

9. A clinch fastener as recited in claim 1, wherein each of the plurality of ribs commences with a section that is perpendicular to the central axis of the clinch fastener, and a remainder of each rib comprises a plurality of sections, wherein at least two of the sections are curved and defined by different radii or a plurality of line segments.

10. A clinch fastener as recited in claim 1, wherein each of the plurality of ribs commences with a section that is perpendicular to the central axis of the clinch fastener, wherein each rib has at least one section that is curved and one section that is flat.

11. A clinch fastener as recited in claim 1, wherein each of the plurality of ribs comprises a plurality of flat sections that collectively provide that the rib diminishes in height as the rib extends to the outer periphery of the head.

12. A clinch fastener as recited in claim 1, wherein each of the plurality of ribs comprises tapered sidewalls.

13. A clinch fastener as recited in claim 1, wherein each of the plurality of ribs comprises outwardly tapered sidewalls.

14. A clinch fastener as recited in claim 1, wherein the plurality of ribs are configured to provide for reduced warping of the workpiece material during installation as a result of the plurality of ribs being configured to provide for radially focused material displacement of workpiece material resulting from a taper on a sidewall of each of the ribs.

15. A clinch fastener as recited in claim 1, wherein each of the plurality of ribs commences with a section that is perpendicular to the central axis of the clinch fastener, and a remainder of each rib comprises a plurality of sections, and wherein the plurality of sections form the parametric profile of the plurality of ribs.

16. A clinch fastener as recited in claim 15, wherein the parametric profile of each of the plurality of ribs is defined by a plurality of parameters including a rib height, a distance from a central axis of the clinch fastener to an end of the rib, and a predefined angle Theta.

17. A clinch fastener for installation relative to a workpiece, said clinch fastener comprising:
a shaft defining a central axis of the clinch fastener;
a head cooperating with the shaft, the head having an outer periphery; and
a plurality of ribs disposed under the head to engage the workpiece upon installation of the clinch fastener to the workpiece, wherein each of the plurality of ribs, in a direction going from the central axis of the clinch fastener to the outer periphery of the head of the clinch fastener, comprises a non-flat surface having a curved surface and a parametric profile;
wherein each of the plurality of ribs commences with a section that is perpendicular to the central axis of the clinch fastener, and a remainder of each of the plurality of ribs comprises a plurality of sections, wherein at least two of the sections are curved and defined by different radii or a plurality of line segments,
wherein the plurality of ribs are configured to radially displace workpiece material when secured to the workpiece to diffuse stress within the workpiece material.

18. A clinch fastener as recited in claim 17, wherein each of the ribs diminish in height as each of the ribs extends in a direction going from the central axis of the clinch fastener to the outer periphery of the head of the clinch fastener.

19. A clinch fastener as recited in claim 17, wherein the plurality of ribs are configured to provide for reduced warping of the workpiece material during installation as a result of the plurality of ribs being configured to provide for radially focused material displacement of workpiece material resulting from a taper on a sidewall of each of the ribs.

20. A clinch fastener as recited in claim 17, wherein the clinch fastener comprises a nut having a threaded bore.

\* \* \* \* \*